(12) United States Patent
Shimotsu et al.

(10) Patent No.: US 9,680,243 B2
(45) Date of Patent: Jun. 13, 2017

(54) CARD HOLDING MEMBER AND CARD CONNECTOR SET

(71) Applicant: Molex, LLC, Lisle, IL (US)

(72) Inventors: Akihiro Shimotsu, Ebina (JP); Nobuki Ukita, Yamato (JP); Nobumasa Motohashi, Yamato (JP); Kenichi Kadono, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/886,278

(22) Filed: Oct. 19, 2015

(65) Prior Publication Data

US 2016/0111802 A1  Apr. 21, 2016

(30) Foreign Application Priority Data

Oct. 20, 2014  (JP) ................................ 2014-213688

(51) Int. Cl.

| H01R 13/62 | (2006.01) |
|---|---|
| H01R 12/70 | (2011.01) |
| H01R 13/633 | (2006.01) |
| G06K 13/14 | (2006.01) |
| G06K 13/08 | (2006.01) |
| G06K 7/00 | (2006.01) |

(52) U.S. Cl.
CPC ......... *H01R 12/7076* (2013.01); *G06K 13/08* (2013.01); *H01R 13/633* (2013.01); *G06K 7/0021* (2013.01); *G06K 13/0806* (2013.01); *G06K 13/0812* (2013.01); *G06K 13/0825* (2013.01); *G06K 13/0831* (2013.01); *G06K 13/14* (2013.01)

(58) Field of Classification Search
CPC .. G06K 13/0831; G06K 7/0021; G06K 13/08; G06K 13/0806; G06K 13/14; G06K 13/0812; G06K 13/0825
USPC ........................................................ 439/159
See application file for complete search history.

(56) References Cited

U.S. PATENT DOCUMENTS

| 2014/0342601 A1* | 11/2014 | Matsunaga | ............ H01R 13/74 |
|---|---|---|---|
| | | | 439/527 |
| 2015/0155651 A1* | 6/2015 | Ejiri | .................. H01R 13/5213 |
| | | | 439/521 |

FOREIGN PATENT DOCUMENTS

| JP | 08-335255 A | 12/1996 |
|---|---|---|
| JP | 2011-244247 A | 12/2011 |
| JP | 2014-182920 A | 9/2014 |
| TW | M479539 U | 6/2014 |

* cited by examiner

*Primary Examiner* — Abdullah Riyami
*Assistant Examiner* — Justin Kratt
(74) *Attorney, Agent, or Firm* — James A. O'Malley (57) ABSTRACT

A card holding member is provided which is able to hold a card having terminal members and is able to be inserted into a card connector. The card holding member includes a card holding frame portion facing the side surfaces of the card, and a first portion including a first connecting portion. The card holding member further includes a main body portion, and a second portion including a second connecting portion connected to the first connecting portion. The card holding member further includes a first elastic member mounted on the outer periphery of the main body portion. The card holding member further includes a second elastic member mounted between the first connecting portion and the second connecting portion.

19 Claims, 10 Drawing Sheets

Prior art

FIG. 10

CARD HOLDING MEMBER AND CARD CONNECTOR SET

RELATED APPLICATIONS

This application claims priority to Japanese Application No. 2014-213688, filed Oct. 20, 2014, which is incorporated herein by reference in its entirety.

TECHNICAL FIELD

The present invention relates to a card holding member and a card connector set.

BACKGROUND ART

Electronic devices such as personal computers, cell phones, personal digital assistants (PDAs), digital cameras, video cameras, music players, gaming devices and car navigation systems include card connectors that allow various types of cards to be used. These include Subscriber Identity Module (SIM) cards, Multi-media Cards® (MMC), Secure Digital® (SD) cards, miniSD® cards, xDPicture® cards, Memory Sticks®, Memory Stick Duo®, Smart Media®, Trans-Flash® memory cards, and MicroSD® cards.

Electronic devices have become significantly smaller in recent years, and so have cards and card connectors. As a result, it can be difficult for users to grasp a card with the fingers and insert the card properly into a card connector. Therefore, card connectors have been proposed in which a card is set inside a card holder and the card holder is inserted into the card connector (see, for example, Patent Document 1).

Figure 10:
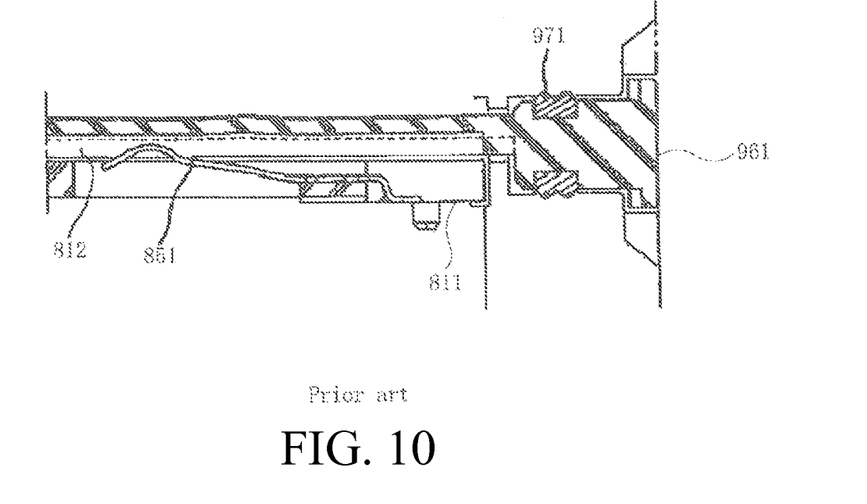
FIG. 10 is a cross-sectional view showing a card connector of the prior art.

FIG. 10 is a cross-sectional view showing a card connector of the prior art.

In this drawing, 811 is a housing for the card connector which is made of an insulating resin material and which is attached to the main body of a device such as a mobile phone. Multiple cantilevered support panel-like contacts 851 are mounted in the housing 811, and the leading ends of the contacts 851 are passed through a slot 812 formed in the housing 811 so as to be able to come into contact with electrode pads on a card (not shown).

Also, 961 is a card holder made of an insulating resin material which is inserted into an insertion slot in the housing 811 while holding a card in the internal space of the card holder. A rubber gasket 971 is mounted on the end of the card holder 961 opposite the end on the inserted side. As shown in the drawing, when the card holder 961 is inserted into the housing 811, the gasket 971 comes into contact with the inner peripheral surface of the card holder insertion slot formed in the main body of the device, sealing the space between the outer peripheral surface of the card holder 961 and the inner peripheral surface of the card holder insertion slot, and preventing contamination of the interior of the device by water and grime from the outside.

PRIOR ART DOCUMENTS

Laid-Open Patent Publication No. 8-335255

SUMMARY OF THE INVENTION

However, in a card connector of the prior art, errors sometimes occur when the housing 811 is mounted in the main body of the device, and a slight discrepancy occurs in the positions of the insertion slot of the housing 811 and the card holder insertion slot formed on the main body of the device. When this occurs, it can be difficult to insert the card holder 961 into the housing 811. Even when the card holder 961 can be inserted in the housing 811, the end of the card holder 961 opposite the end on the insertion side may be inclined relative to the card holding insertion slot and is askew in one direction. In these situations, the space between the outer peripheral surface of the card holder 961 and the inner peripheral surface of the card holder insertion slot is not completely sealed by the gasket 971, and the interior of the device may become contaminated with water and grime from the outside.

It is desirable to solve this problem by providing a highly reliable card holding member and card connector set in which a first elastic member and a second elastic member are installed in the card holding member to facilitate easy and reliable insertion and ejection of the card holding member from the card connector, and to reliably prevent contamination by foreign matter from the outside.

The present disclosure provides a card holding member able to hold a card having terminal members and able to be inserted into a card connector, the card holding member comprising: a card holding frame portion facing the side surfaces of a card, and a first portion including a first connecting portion; a main body portion, and a second portion including a second connecting portion connected to the first connecting portion; a first elastic member mounted on the outer periphery of the main body portion; and a second elastic member mounted between the first connecting portion and the second connecting portion.

In another aspect of the card holding member of the present disclosure, the card holding member can be inserted into a car connector via an insertion slot in a wall member, the portion of the main body portion including the mounted first elastic member can be inserted into the insertion slot, and the first elastic member is interposed between this portion and the insertion slot when the portion has been inserted into the insertion slot.

In another aspect of the card holding member of the present disclosure, the first connecting portion and the second connecting portion are connected via the second elastic member.

In another aspect of the card holding member of the present disclosure, an ejection operation member for operating an ejection mechanism for ejecting the card holding member from the card connector is mounted slidably on the main body portion via a third elastic member.

In another aspect of the card holding member of the present disclosure, the main body portion includes a through-hole for insertion of the ejection operation member, and the third elastic member is interposed between the ejection operation member and the through-hole.

In another aspect of the card holding member of the present disclosure, the card holding member further comprises a metal portion integrally formed from a metal plate, and the first portion and the second portion are made of a resin and cover and are integrated with at least a portion of the metal portion on the periphery.

The present disclosure also provides a card connector set comprising: a card holding member described above, and a card connector able to receive the card holding member and including an ejection mechanism for ejecting the card holding member from the card connector.

The card holding member of the present disclosure includes a first elastic member and a second elastic member, which facilitates easy and reliable insertion and ejection of the card holding member from the card connector, and which reliably prevents contamination by foreign matter from the outside.

BRIEF DESCRIPTION OF THE DRAWINGS

FIGS. 1A and 1B are a pair of perspective views of the card connector set in a first embodiment of the present disclosure showing the card tray inserted into the card connector, in which FIG. 1A is a first perspective view.

FIGS. 2A, 2B and 2C are a set of views of the card connector set in the first embodiment of the present disclosure showing the card tray inserted into the card connector, in which FIG. 2A is a top view.

FIGS. 4A, 4B, 4C and 4D are a set of views showing the card tray in the first embodiment of the present disclosure, in which FIG. 4A is a top view, FIG. 4B is a rear view.

FIGS. 6A and 6B are a pair of perspective views showing the operations performed to insert the card tray into the card connector in the first embodiment of the present disclosure, in which

FIGS. 8A and 8B are a pair of views showing the operations performed to eject the card tray from the card connector in the first embodiment of the present disclosure, in which FIG. 8A is a top view.

FIGS. 9A, 9B and 9C are a set of views showing the integrated elastic member in the card tray in a second embodiment of the present disclosure, in which FIG. 9A is a top view.

DETAILED DESCRIPTION OF THE PREFERRED EMBODIMENTS

The following is a detailed explanation of embodiments of the present disclosure with reference to the drawings.

Figure 1A:
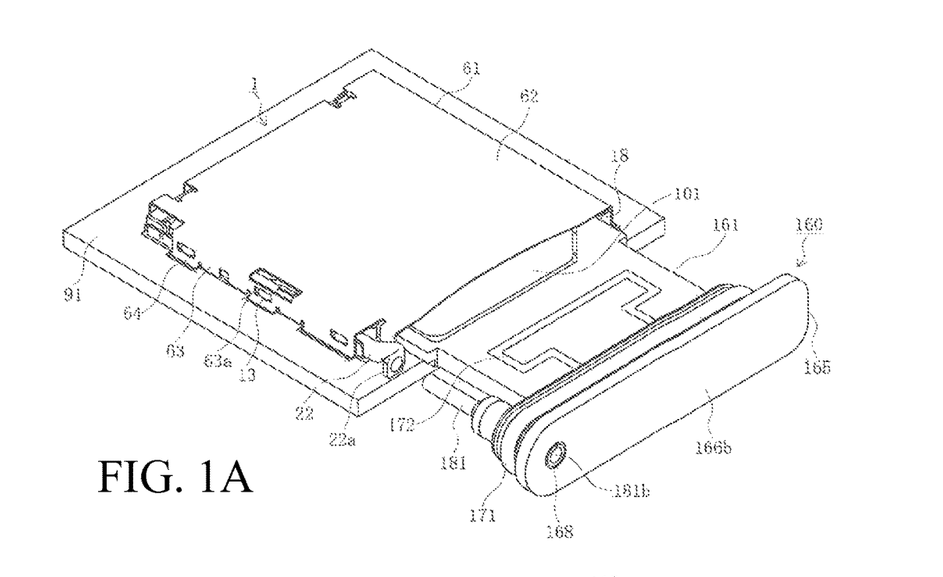
Figure 1B:
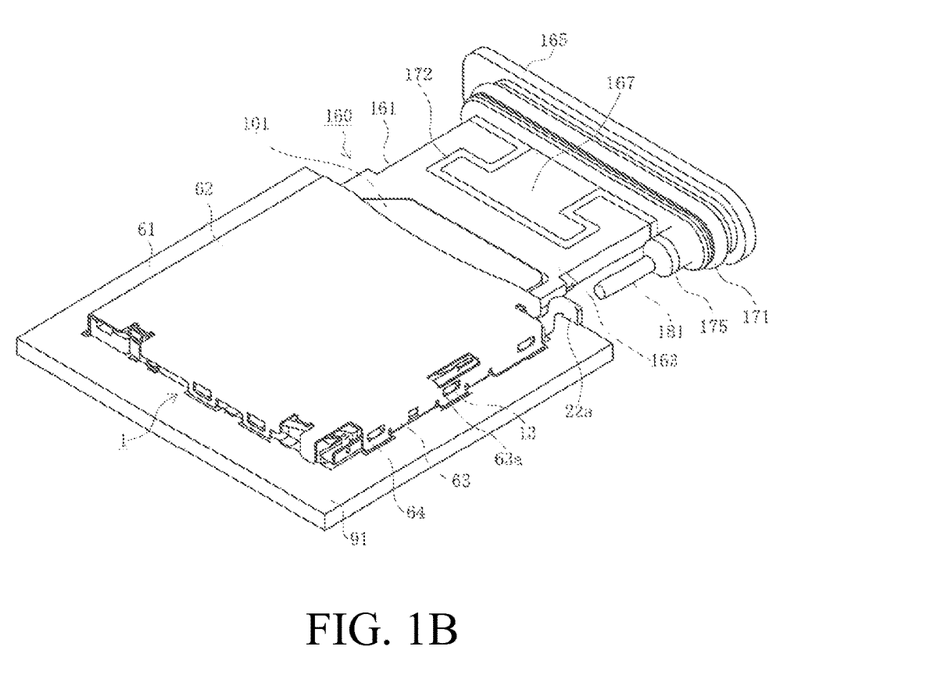
FIG. 1B is a second perspective view.
Figure 2A:
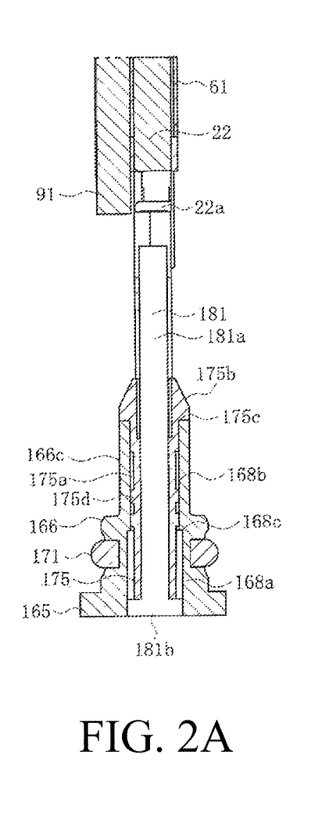
Figure 2B:
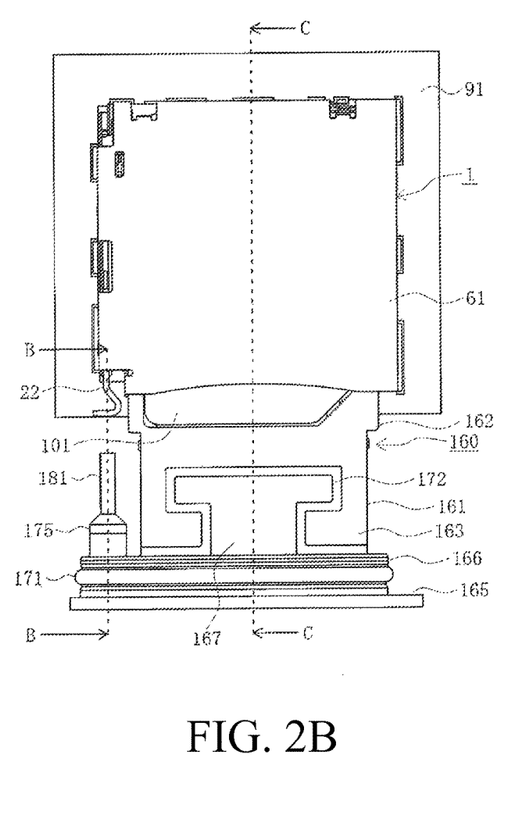
FIG. 2B is an enlarged cross-sectional view from B-B in FIG. 2A.
Figure 2C:
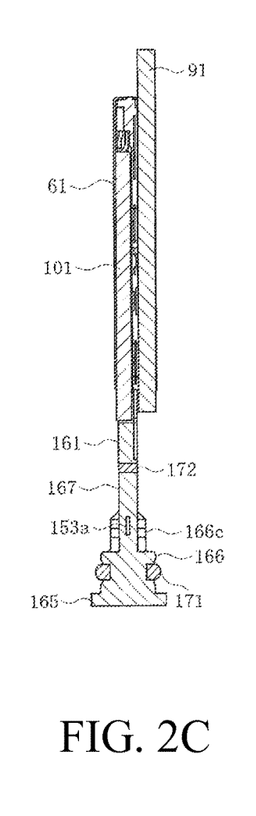
FIG. 2C is a cross-sectional view from C-C in FIG. 2A.
Figure 3:
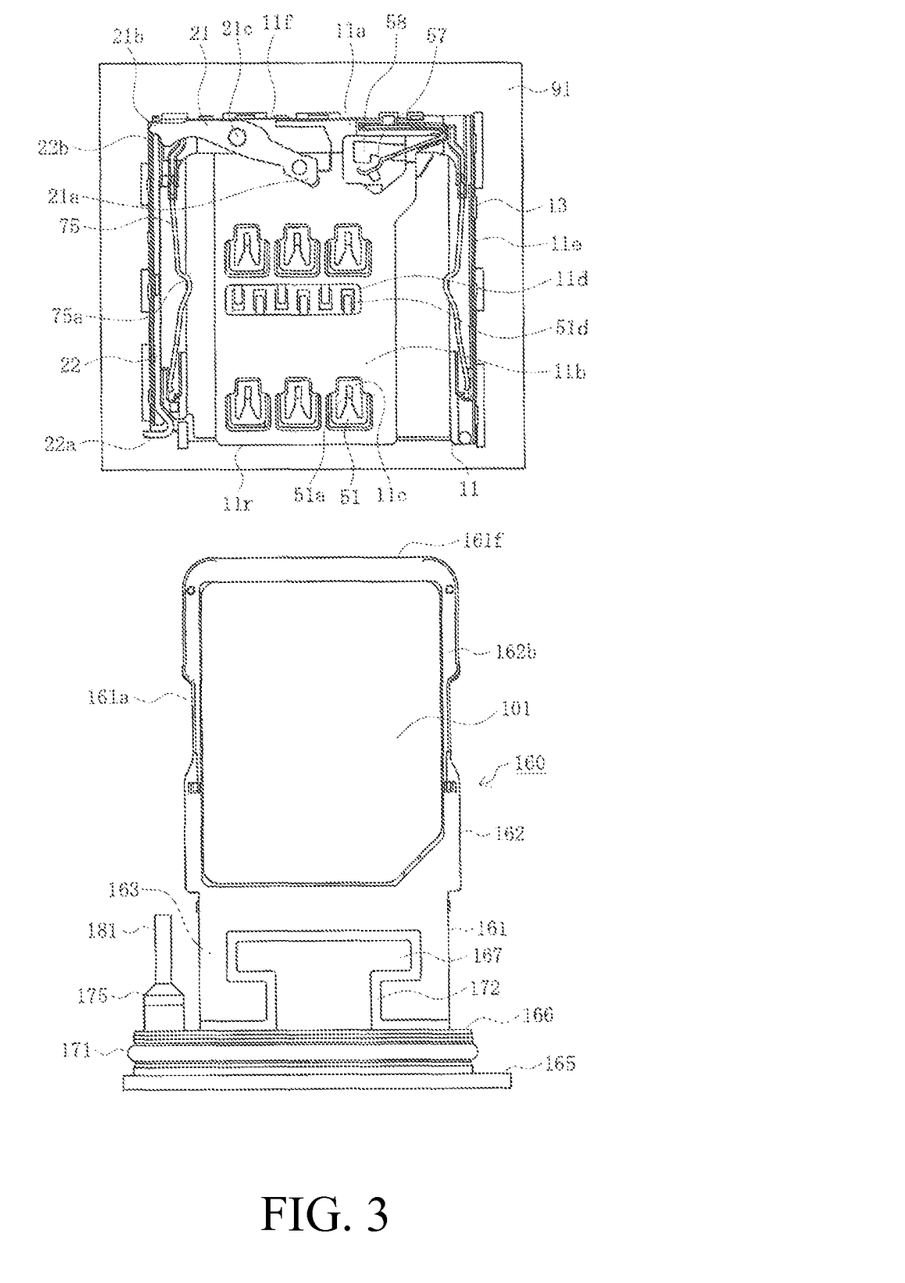
FIG. 3 is a top view of the first embodiment of the present disclosure with the shell removed showing the card tray just before insertion into the card connector.
Figures 4A, 4B:
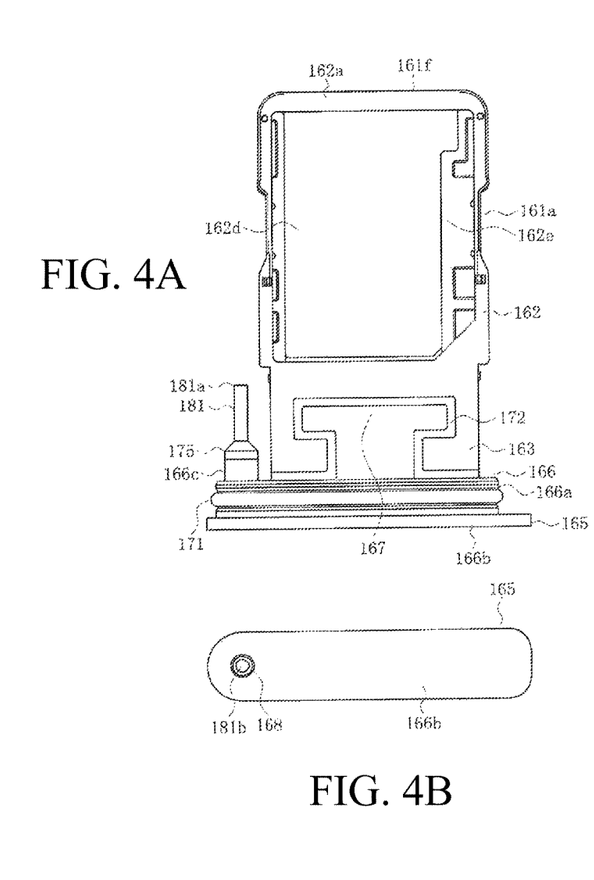
Figure 4C:
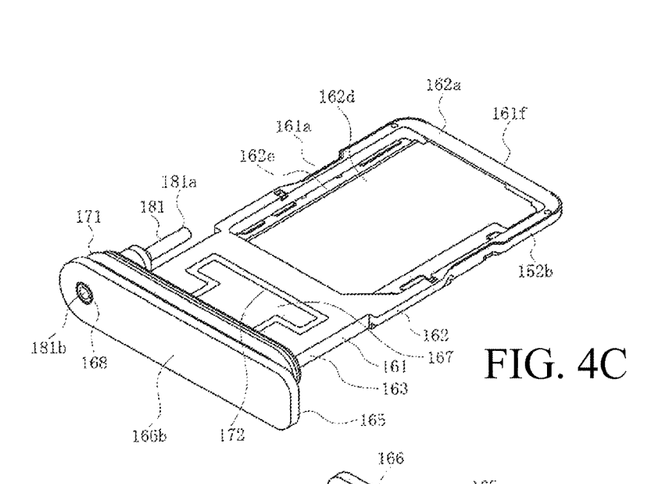
FIG. 4C is a first perspective view.
Figure 4D:
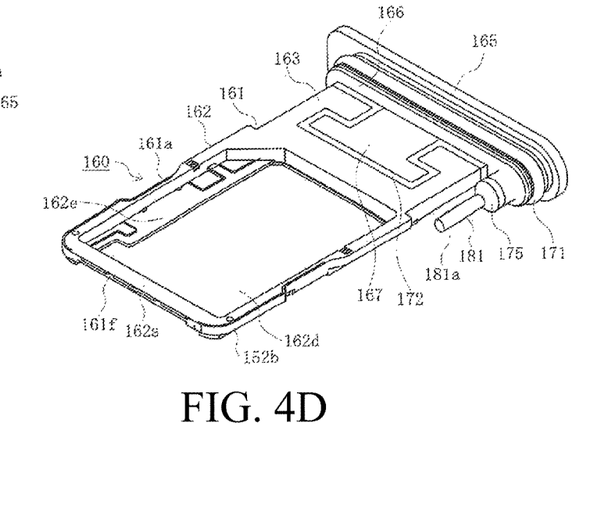
FIG. 4D is a second perspective view.
Figure 5:
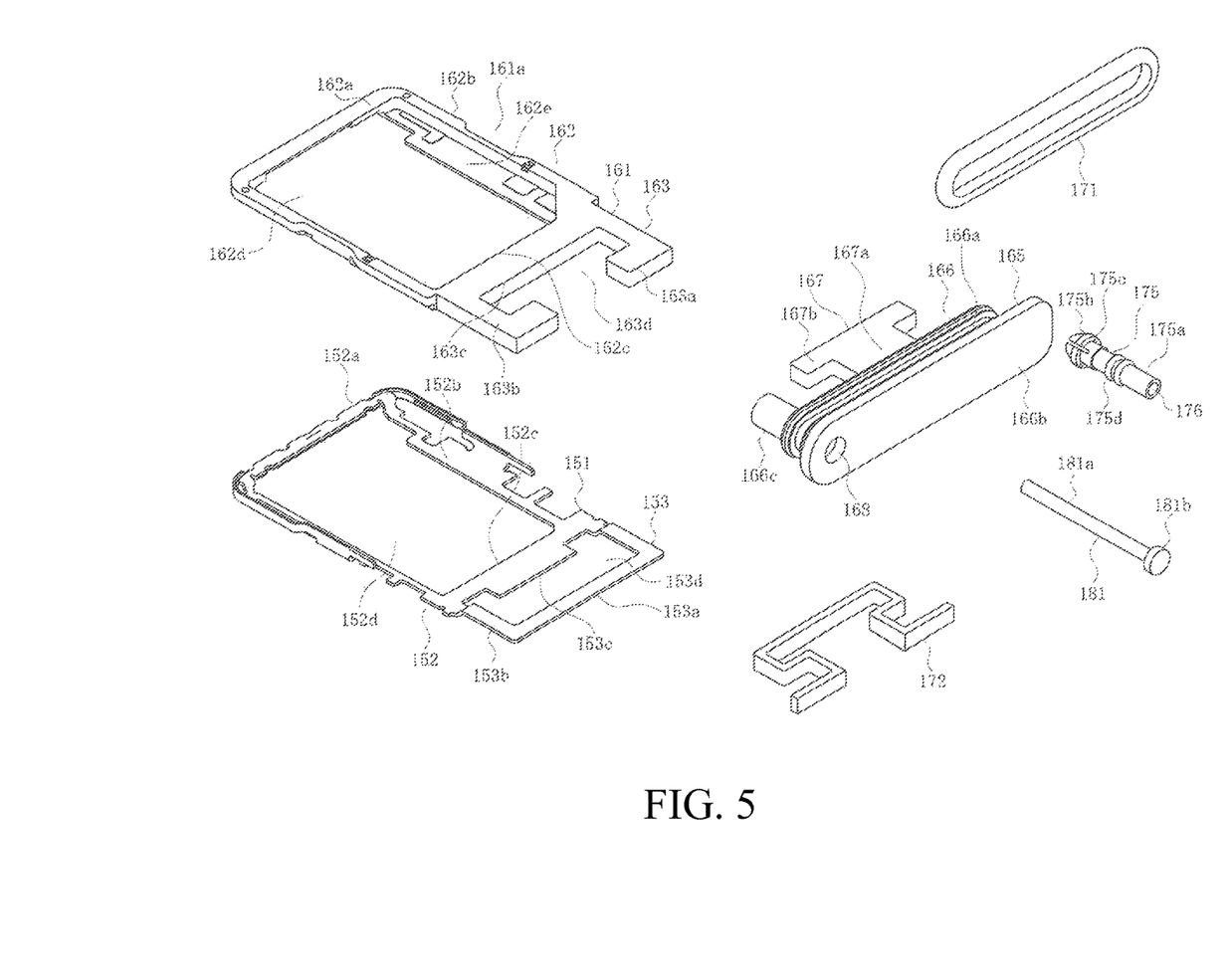
FIG. 5 is an exploded perspective view of the card tray in the first embodiment of the present disclosure.

FIGS. 1A and 1B are a pair of perspective views of the card connector set in a first embodiment of the present disclosure showing the card tray inserted into the card connector. FIGS. 2A, 2B and 2C are a set of views of the card connector set in the first embodiment of the present disclosure showing the card tray inserted into the card connector. FIG. 3 is a top view of the first embodiment of the present disclosure with the shell removed showing the card tray just before insertion into the card connector. FIGS. 4A, 4B, 4C and 4D are a set of views showing the card tray in the first embodiment of the present disclosure. FIG. 5 is an exploded perspective view of the card tray in the first embodiment of the present disclosure.

In the drawings, 160 is the card tray serving as the card holding member in the present disclosure. As shown in FIG. 3, it is inserted into a card connector 1 mounted on a board 91 in an electronic device (not shown) while housing a card 101. In other words, a card 101 is accommodated inside the card tray 160 with both side surfaces surrounded by a frame portion facing the side surfaces, and is mounted in an electronic device via a card connector 1. The shell 61 has been removed from the card connector 1 in FIG. 3 for convenience of explanation.

The electronic device may be any type of device, including a personal computer, a mobile phone, a communication modem, a PDA, a digital camera, a video camera, a music player, a gaming console, or a car navigation system. The board 91 can be any type of board mounted inside an electronic device such as a printed circuit board.

However, when a card connector other than card connector 1 is mounted in an electronic device, the user sometimes does not use the card connector 1. In this case, the user can insert the empty card tray 160, that is, the card tray 160 not housing a card 101, into the card connector 1 for storage.

The card 101 can be any type of card such as a SIM card, a microSIM card, MMC® card, SD® card, miniSD® card, xD-Picture® card, Memory Stick®, Memory Stick Duo®, Smart Media®, or Trans-Flash® memory card. In the explanation of the present embodiment, the card is a 4th Form Factor (4FF) card or so-called nanoSIM card. In accordance with the ETSI TS 102 221 V11.00 card standard, the nanoSIM card has a longitudinal length of 12.3 mm, a width of 8.8 mm, and a thickness of 0.67 mm.

In the present embodiment, the card 101 has a substantially rectangular band-like shape, and electrode pads serving as the terminal members (not shown) are arranged in two rows of three along the front end and the rear end on the lower surface. In other words, the electrode pads are arranged in two rows extending in the transverse direction of the card 101. Electrode pads are not provided on the upper surface, that is, on the side opposite the terminal accommodating surface.

In the present embodiment, the expressions indicating direction, such as upper, lower, left, right, front and rear, which are used to explain the configuration and operation of each portion of the card connector 1, card tray 160, and card 101, are relative and not absolute. They depend on the orientation of the connector 1, card tray 160, and card 101, and their constituent components shown in the drawings. When the orientation of the connector 1, card tray 160, and card 101 or their constituent components changes, the interpretation changes in response to the change in orientation.

Here, as shown in FIG. 5, the card tray 160 includes a metal portion 151 integrally formed by stamping and bending a metal plate, and a first portion of first resin portion 161 and a second portion or second resin portion 165 made of an insulating resin covering and becoming integrated with a portion of the metal portion 151 using a molding technique such as insert molding or overmolding. The first resin portion 161 and the second resin portion 165 are completely separate members.

The metal portion 151 is a member made of a metal plate and includes a rectangular first metal frame portion 152 and second metal frame portion 153. The first metal frame portion 152 and second metal frame portion 153 are integrally formed.

Here, the first metal frame portion 152 is a rectangular frame member surrounding all four sides of rectangular opening 152d exposing the electrode pads of the card 101. It has a first metal transverse portion 152a and a central metal transverse portion 152c extending parallel to each other in the transverse direction, and a pair of left and right first metal longitudinal portions 152b extending in the longitudinal direction and connecting both ends of the first metal transverse portion 152a to both ends of the central metal transverse portion 152c.

The second metal frame portion 153 is a rectangular frame member surrounding all four sides of rectangular opening 153d. It has a second metal transverse portion 153a and a central metal transverse portion 153c extending parallel to each other in the transverse direction, and a pair of left and right second metal longitudinal portions 153b extending in the longitudinal direction and connecting both ends of the second metal transverse portion 153a to both ends of the central metal transverse portion 153c. The middle transverse portion 153c of the second metal frame portion 153 is integrated with the central metal transverse portion 152c of the first metal frame portion 152, and the second metal transverse portion 153a is parallel to the first metal transverse portion 152a.

The first resin portion 161 includes a substantially rectangular card holding frame portion 162 and a female connecting portion 163 serving as a first connecting portion. The card holding frame portion 162 and the female connecting portion 163 are integrally formed. Also, the card holding frame portion 162 is integrated with the first metal frame portion 152 and the female connecting portion 163 is integrated with the second metal frame portion 153 using a molding method such as insert molding or overmolding. The entire surface of the first metal frame portion 152 and the second metal frame portion 153 does not have to be covered by the card holding frame portion 162 and the female connecting portion 163. Some of the surface can be exposed by the surface of the card holding frame portion 162 and the female connecting portion 163.

The card holding frame portion 162 is a frame member facing the sides of the card 101 and surrounding all four sides of a rectangular space 162d serving as an opening for exposing the electrode pads of the card 101. This frame member includes a first transverse frame portion 162a and a second transverse frame portion 162c extending parallel to each other in the transverse direction, and a pair of left and right first longitudinal frame portions 162b extending in the longitudinal direction and connecting both ends of the first transverse frame portion 162a to both ends of the second transverse frame portion 162c. Eaves portions 162e extend into the space 162d from the inside bottom ends of the first transverse portion 162b. The eaves portion 162e serve as card supporting portions that support at least a portion of the bottom surface of a card 101 housed inside the space 162d, usually the portion close to the side. A holding recessed portion 161a is formed on the outer surface of the first transverse portion 162b to hold and secure a card tray 160 inserted into the card connector 1.

The female connecting portion 163 is a member which partially surrounds a T-shaped opening 163d, and includes an engaging transverse portion 163a and a second transverse portion 163c extending in the transverse direction parallel to each other, and a pair of left and right engaging longitudinal portions 163b extending in the longitudinal direction and connecting both ends of the engaging transverse portion 163a to both ends of the second transverse portion 163c. The engaging transverse portion 163a is integrated with the second metal transverse portion 153a of the second metal frame portion 153 but the central portion is missing. Therefore, the engaging transverse portion 163a and the engaging longitudinal portion 163b form a pair of left and right L-shaped engaging arms. Also, the second transverse portion 163c of the female connecting portion 163 is integrated with the second transverse portion 162c of the card holding frame portion 162.

The second resin portion 165 includes an operating portion 166 serving as the main body portion, and a male connecting portion 167 serving as a second connecting portion. The operating portion 166 and the male connecting portion 167 are integrally formed. The male connecting portion 167 is also integrally formed with the second metal transverse frame portion 153a of the second metal frame portion 153 using a molding technique such as insert molding or overmolding.

The operating portion 166 is a column-shaped member having an oval-shaped or substantially elliptical cross-sectional profile extending along its long axis in the transverse direction, and includes a recessed groove portion 166a formed so as to surround the peripheral wall surface, a rear panel portion 166b having an oval-shaped or substantially elliptical cross-sectional profile extending along its long axis in the transverse direction and connected in the rear, and a column-shaped guide portion 166c protruding forward near one end in the transverse direction. The rear end of the guide portion 166c opens into the rear surface of the rear panel portion 166b, and a through-hole 168 with a round cross-sectional profile is formed which extends linearly to the rear so that the front end opens in the front surface of the guide portion 166c.

The male connecting portion 167 is a substantially T-shaped plate having a complementary relationship with the female connecting portion 163, and includes a column-shaped portion 167a extending forward, and a pair of engaging protruding portions 167b protruding to the left and right at the front end of the column-shaped portion 167a. The column-shaped portion 167a corresponds to the missing central portion of the engaging transverse portion 163a of the female connecting portion 163, and is integrated with the second metal transverse frame portion 153a of the second metal frame portion 153. The rear end of the column-shaped portion 167a is integrally connected to the front end of the operating portion 166. As shown in FIGS. 2A, 2B and 2C, the male connecting portion 167 is housed inside the opening 163d in the female connecting portion 163 so that the second resin portion 165 is connected to the first resin portion 161.

A first elastic member 171, a second elastic member 172, a third elastic member 175, and an ejection operation member 181 are attached to the card tray 160.

The first elastic member 171 is a ring-shaped component made of a soft, elastic material such as silicone rubber, and is inserted into the recessed groove portion 166a of the second resin portion 165. The second elastic member 172 is an omega-shaped band or cord made of the same soft, elastic material as the first elastic member 171 such as silicone rubber, and is inserted into the space between the male connecting portion 167 and the female connecting portion 163 as shown in FIGS. 2A, 2B and 2C. The first elastic member 171 and the second elastic member 172 can be manually inserted into the recessed groove portion 166a and the space between the male connecting portion 167 and the female connecting portion 163. However, the first elastic member 171 and the second elastic member 172 can also be molded in the recessed groove portion 166a and the space between the male connecting portion 167 and the female connecting portion 163 when the first resin portion 161 and the second resin portion 165 are molded by performing two-color or multi-color molding in the same mold.

In the card tray 160 of the present embodiment, the first resin portion 161 and the second resin portion 165 are separate from each other but connected via the second elastic member 172. As a result, the second elastic member 172 can be displaced only by the amount corresponding to the amount by which it can be deformed. The female connecting portion 163 of the first resin portion 161 is integrated with the second metal frame portion 153, and the column-shaped portion 167a of the male connecting portion 167 of the second resin portion 165 is integrated with the second metal transverse portion 153a of the second metal frame portion 153. However, because the second metal transverse portion 153a can be elastically deformed to a certain degree, the first resin portion 161 and the second resin portion 165 can be displaced relative to each other.

As in the case of the first elastic member 171 and the second elastic member 172, the third elastic member 175 is made of a soft, elastic material such as silicone rubber, and is inserted into the through-hole 168 in the second resin portion 165 and into the space with the ejection operation member 181 inserted into the through-hole 168. The ejection operation member 181 functions as a complementary member for operating the ejection mechanism for ejecting the card tray 160 from the card connector 1. It has a linear, column-shaped rod portion 181a and a round, plate-like head portion 181b connected integrally to the rear end of the rod portion 181a.

The third elastic member 175 includes a linear cylindrical portion 175a, a cone-shaped portion 175b connected integrally to the leading end of the cylindrical portion 175a, and a fin-shaped portion 175d formed on the outer periphery of the cylindrical portion 175a. The rear surface of the third elastic member 175 is open in the rear end of the cylindrical portion 175a, and a central hole 176 with a round cross-sectional profile and a constant inner diameter is formed in the front end and extends longitudinally so as to open into the front end of the cone-shaped portion 175b. The cone-shaped portion 175b has a tapered, conical outer surface. The outer diameter at least on the rear end is greater than the outer diameter of the cylindrical portion 175a, and a tiered portion 175c is formed at the boundary between the rear end and the leading end of the cylindrical portion 175a. The fin-shaped portion 175d is a ring-shaped protrusion formed so as to surround the outer periphery of the cylindrical portion 175a, and the outer diameter is greater than the outer diameter of the cylindrical portion 175a. In the example shown in the drawing, there are two fin-shaped portions 175d. However, there can be one or even three or more fin-shaped portions.

As shown in FIG. 2B, the ejection operation member 181 is mounted via the third elastic member 175 in the through-hole 168 in the card tray 160. The through-hole 168 has a large-diameter portion 168a near the rear end, a small-diameter portion 168b near the front end, and a tiered portion 168c formed at the boundary between the large-diameter portion 168a and the small-diameter portion 168b. The diameter of the large-diameter portion 168a is greater than the outer diameter of the head portion 181b of the ejection operation member 181, and the diameter of the small-diameter portion 168b is smaller than the outer diameter of the head portion 181b of the ejection operation member 181.

The cylindrical portion 175a of the third elastic member 175 is housed completely inside the through-hole 168, and the fin-shaped portion 175d presses against the inner surface of the large-diameter portion 168a when the rod portion 181a of the ejection operation member 181 is inserted into the central hole 176. The tiered portion 175c comes into contact with the front end of the guide portion 166c to adjust the position of the third elastic member 175 in the longitudinal direction relative to the guide portion 166c, and to keep the third elastic member 175 from becoming displaced further to the rear relative to the guide portion 166c. The third elastic member 175 can advance relative to the guide portion 166c along with the forward motion of the ejection operation member 181, but the ejection operation member 181 cannot be displace any further forward when the head portion 181b comes into contact with the tiered portion 168c. The third elastic member 175 also cannot advance any further.

Because the third elastic member 175 is soft and the cone-shaped portion 175b can be significantly deformed, the third elastic member 175 with the rod portion 181a of the ejection operation member 181 inserted in the central hole 176 can be manually pushed into the through-hole 168 from the opening in the rear surface of the rear panel portion 166b to reach the point shown in FIG. 2B, that is, the point at which the third elastic member 175 and the ejection operation member 181 can be attached to the card tray 160.

In the present embodiment, the card connector 1 has an integrally molded housing 11 made of an insulating material such as a resin, and a shell 61 serving as a cover member integrally formed by stamping and bending a conductive metal plate which is mounted on top of the housing 11. The shell 61 covers at least some of the top of housing 11 and the card tray 160 inserted into the card connector 1. The card connector 1 has a flat, three-dimensional rectangular shape. It is mounted on a board 91 in an electronic device, and receives the card tray 160 into the housing 11 from an insertion slot 18 in the rear (lower right in FIG. 1A). More specifically, the card tray 160 is inserted from the front end 161f into the card insertion space formed between the housing 11 and the shell 61.

As shown in FIG. 3, the housing 11 has a substantially rectangular plate-like bottom wall portion 11b, and an inner wall portion 11a rising from the bottom wall portion 11b and extending along the front end 11f portion or the end portion in the direction of insertion for the card tray 160 into the housing 11. The rear end portion in the direction of insertion for the card tray 160 into the housing 11 is referred to as the rear end portion 11r.

Here, the bottom wall portion 11b has terminal holding recessed portions 11c for holding the terminals 51. The terminal holding recessed portions 11c are openings passing through the bottom wall portion 11b in the thickness direction, and are arranged in parallel rows that extend in the transverse direction of the housing 11. In the example shown in the drawing, there are two rows of three openings each. In other words, the terminal holding recessed portions 11c and the terminal 51 held in each of the terminal holding recessed portions 11c are arranged so as to form two rows that extend in the transverse direction of the housing 11. At least some of each terminal 51 is embedded in the bottom wall portion 11b, and the contact portion 51a is exposed inside the terminal holding recessed portions 11c. The contact portion 51a is biased upwards by the spring action of the arm portion of the each terminal 51, and comes into contact with the corresponding electrode pad on the card 101 inside the card tray 160 held inside the card connector 1. The number and arrangement of the terminals 51 can be changed to correspond to the number and arrangement of electrode pads on the card 101.

Also, a solder tail opening 11d is formed in the bottom wall portion 11b which passes through in the thickness direction of the bottom wall portion 11b. The solder tail portion 51d is exposed in the solder tail opening 11d as the base connecting portion of each terminal 51. Each solder tail portion 51d is connected to a terminal 51 via a coupling portion (not shown) embedded in the bottom wall portion 11b. Each solder tail portion 51d is then connected electrically via solder to a terminal member such as a signal line, contact pad, or terminal formed on the board 91.

The housing 11 has a pair of left and right side wall portions 11e extending longitudinally along the side edges, and a holding spring member 75 is arranged inside each side wall portion 11e to hold and secure the card tray 160. The holding spring member 75 is a slender plate spring extending in the longitudinal direction, and a holding protruding portion 75a is formed near the center portion and extends into the housing 11 in the transverse direction. The holding protruding portion 75a engages the holding recessed portion 161a of the card tray 160 to hold and secure the card tray 160 inserted into the card connector 1 as shown in FIGS. 1A, 1B, 2A, 2B and 2C.

A push rod 22 is slidably mounted in the longitudinal direction on the inside surface of one of the side wall portions 11e. This serves as the tray ejection operation member in the tray ejection mechanism for ejecting the card tray 160 inserted into the card connector 1. The push rod 22 is a linear rod-shaped or band-shaped member, and a bent operating portion 22a is integrally connected to the rear end portion. The operating portion 22a is shaped so that the leading end of the ejection operation member 181 can easily make contact with it.

An engaging portion 22b is formed in the front end portion of the push rod 22 to engage the force input portion 21b of the ejection lever 21. The ejection lever 21 is a lever-shaped member arranged near the inner wall portion 11a, and functions as the tray ejection lever of the tray ejection mechanism. As a result, the ejection lever 21 is pivotally mounted on the bottom wall portion 11b at the fulcrum portion 21c. The end on the other side of the fulcrum portion 21b from the force input portion 21b functions as the force output portion 21a which comes into contact with the front end 161f of the card tray 160 inserted into the card connector 1 and applies force to the card tray 160 in the direction of ejection.

The shell 61 has a substantially rectangular ceiling panel portion 62 and side panel portions 63 erected on the side edges of the ceiling panel portion 62. A plurality of engaging openings 63a are formed in the side panel portions 63. When the shell 61 is mounted on the housing 11 from above, these engaging openings 63a engage the engaging protruding portions 13 formed on the outer surface of the side wall portions 11e of the housing 11 to secure the shell 61 to the housing 11. Solder tail portions 64 are erected at spots on the bottom end of the side panel portions 63, and serve as substrate connecting portions which extend outward in the transverse direction of the shell 61. The solder tail portions 64 are secured by soldering to an anchoring pad formed on the surface of the board 91.

The card connector 1 also has a first contact member 57 and a second contact member 58 for a detection switch used to detect a card tray 160 that has been inserted into the card connector 1. When a card tray 160 has not been inserted, as shown in FIG. 3, the first contact portion 57 and the second contact portion 58 do not make contact, and the tray detection switch is not electrified, that is, it is turned off. However, when a card tray 160 has been inserted into the card connector 1 and reaches a predetermined position, the first contact member 57 is pushed towards the front end portion 11f by the front end 161f of the card tray 160, and comes into contact with the second contact member 58. As a result, the tray detection switch is electrified, that is, turned on, and it is detected that the card tray 160 has reached the predetermined position in the card connector 1.

The following is an explanation of the operations performed to insert a card tray 160 with this configuration into the card connector 1 and then to eject the tray from the card connector 1.

Figure 6A:
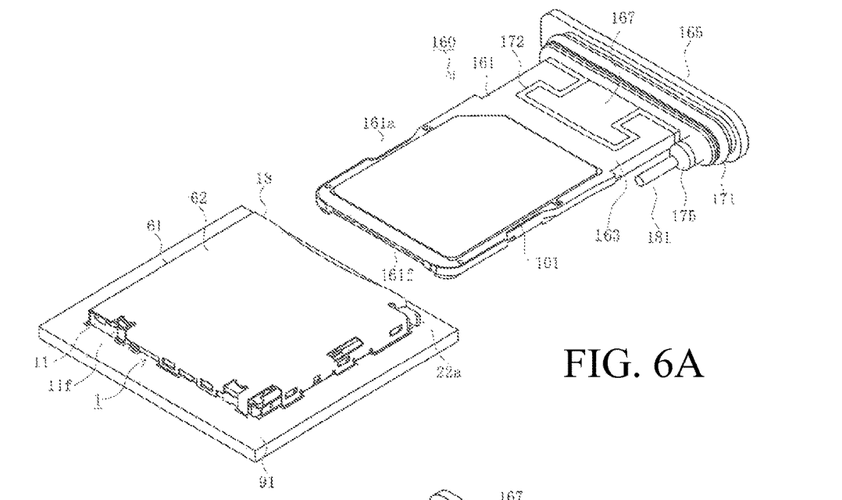
FIG. 6A shows the card tray prior to insertion into the card connector.
Figure 6B:
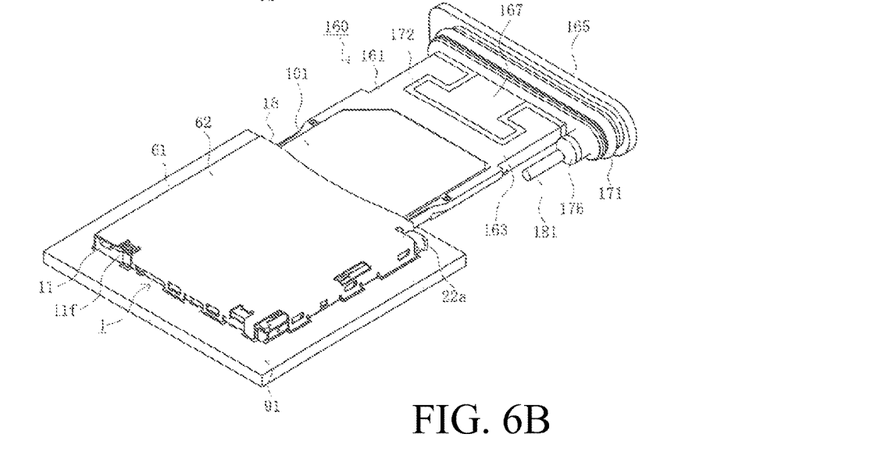
FIG. 6B shows the front end of the card tray inserted into the card connector.
Figure 7:
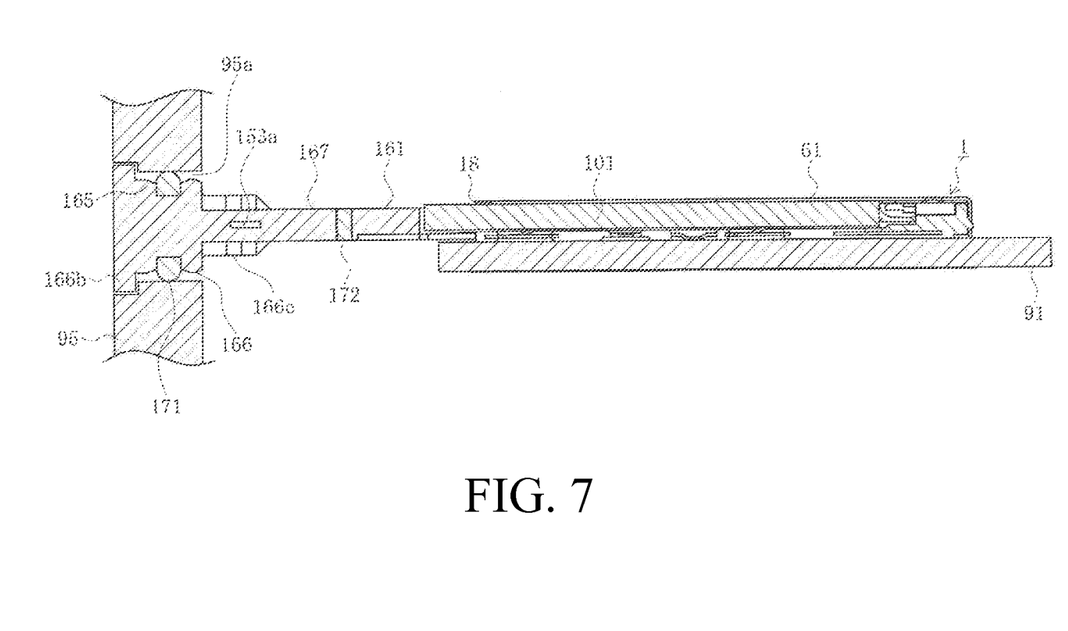
FIG. 7 is a vertical cross-sectional view showing the card tray inserted into the card holder in the first embodiment of the present disclosure.
Figure 8A:
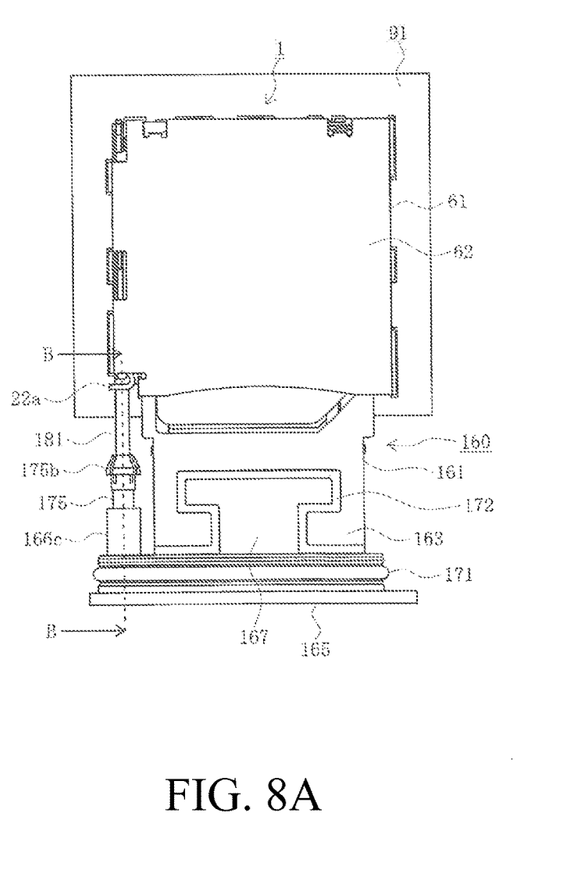
Figure 8B:
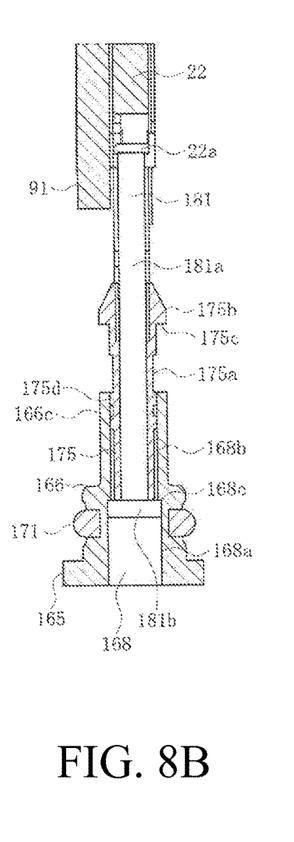
FIG. 8B is an enlarged cross-sectional view from B-B in FIG. 8A.

FIGS. 6A and 6B are a pair of perspective views showing the operations performed to insert the card tray into the card connector in the first embodiment of the present disclosure. FIG. 7 is a vertical cross-sectional view showing the card tray inserted into the card holder in the first embodiment of the present disclosure. FIGS. 8A and 8B are a pair of views showing the operations performed to eject the card tray from the card connector in the first embodiment of the present disclosure.

First, the operations performed to insert the card tray 160 will be explained. As mentioned above, the card tray 160 can be inserted into and ejected from the card connector 1 even when the tray does not include a card 101. In this explanation, the tray is housing a card 101.

Here, the board 91 on which the card connector 1 is mounted is attached inside the case of the electronic device. As shown in FIG. 7, an insertion slot 95a is formed in an outer wall 95 of the case serving as the wall member and passes through the outer wall 95. The card tray 160 is passed through the insertion slot 95a in the outer wall 95 from the outside (from the left in FIG. 7), and is inserted into the card connector 1 from the insertion slot 18. For the sake of convenience, the other outer walls 95 are not depicted in FIG. 7.

First, the user manually places a card tray 160 housing a card 101 near the insertion slot 95a in the outer wall 95 of the case from outside the outer wall 95 positioned to the rear of the card connector 1. Here, the card connector 1 and the outer wall 95 are fixed to each other so that they do not move relative to each other and so that the insertion slot 18 in the card connector 1 is aligned with the insertion slot 95a in the outer wall 95.

Also, as shown in FIG. 6A, the card tray 160 is inserted properly so that the upper surface is facing upward, that is, facing the ceiling panel portion 62 of the shell 61, and the front end 161f is facing the front end portion 11f of the housing 11. Therefore, when the card 101 is housed inside the card tray 160, the lower surface with the electrode pads is exposed and facing downwards, the terminals 51 are facing the bottom wall portion 11b of the housing 11, and the front end is facing the front end portion 11f of the housing 11.

Because the insertion slot 18 in the card connector 1 is aligned with the insertion slot 95a in the outer wall 95, when the card tray 160 is inserted further into the insertion slot 95a, the card tray 160 is inserted through the insertion slot 18 into the card insertion space formed between the housing 11 and the shell 61.

Next, when the user pushes in the card tray 160 even further, as shown in FIGS. 2A, 2B, 2C and 7, the card tray 160 reaches a predetermined position in the card connector 1. At this time, the front end 161f is pressed against, the first contact member 57 and the second contact member 58 make contact and the tray detection switch is turned on, and it is detected that the card tray 160 has reached a predetermined position in the card connector 1.

When the card tray 160 moves beyond the predetermined position in the card connector 1, the force output portion 21a of the ejection lever 21 presses against the front end 161*f* and is further displaced in the direction of the front end portion 11*f*. As a result, the force input portion 21*b* of the ejection lever 21 is further displaced in the direction of the rear end portion 11*r*, and the push rod 22 slides to the point closest to the rear end portion 11*r*.

When the card tray 160 has reached a predetermined position in the card connector 1, the force output portion 21*a* of the ejection lever 21 interferes with the inner wall portion 11*a* of the housing 11 and can no longer be displaced in the direction of the front end portion 11*f*. Therefore, the card tray 160 itself can no longer advance.

When the card tray 160 reaches the predetermined position in the card connector 1, the holding protruding portions 75*a* of the pair of left and right holding spring members 75 engage the holding recessed portions 161*a* formed in the outer surfaces of the first longitudinal portion 162*b* of the first resin portion 161 of the card tray 160. As a result, the card tray 160 is stably held and locked in the predetermined position to keep the tray from being displaced to the rear of the predetermined position.

When the card 101 is housed inside the card tray 160, the card along with the card tray 160 is held in the predetermined position so that data can be exchanged with a computing means in the electronic device containing the card connector 1. When the card 101 is held in the predetermined position, the contact portions 51*a* of the terminals 51 on the card connector 1 make contact and establish an electrical contact with the contact pads on the card 101.

When insertion of the card tray 160 has been completed and the card tray 160 has reached the predetermined position in the card connector 1, as shown in FIG. 7, the first elastic member 171 presses against the inner peripheral surface of the insertion slot 95*a* in the outer wall 95, and the space between the inner peripheral surface of the insertion slot 95*a* and the peripheral wall surface of the operating portion 166 in the second resin portion 165 of the card tray 160 is sealed by the first elastic member 171. As a result, foreign matter such as water and grime from the outside cannot contaminate the interior of the case. In addition, the space between the inner peripheral surface of the through-hole 168 in the card tray 160 and the peripheral wall surface of the rod portion 181*a* of the ejection operation member 181 is sealed by the third elastic member 175. As a result, foreign matter from the outside cannot contaminate the interior of the case via the through-hole 168.

In this explanation, the insertion slot 18 of the card connector 1 and the insertion slot 95*a* in the outer wall 95 are aligned. However, when there has been an error attaching the board 91 inside the case of the electronic device, an error mounting the board 91 on the card connector 1, a dimensional error in the insertion slot 95*a*, or deformation of a component such as the board 91 or the outer wall 95, this may result in a positional discrepancy between insertion slots 18 and 95*a*, that is, misalignment of insertion slots 18 and 95*a*.

However, the card tray 160 in the present embodiment includes a first elastic member 171 and a second elastic member 172, the first elastic member 171 is mounted on the operating portion 166 of the second resin portion 165, and the second elastic member 172 is interposed between the female connecting portion 163 of the first resin portion 161 and the male connecting portion 167 of the second resin portion 165. As a result, the card tray 160 can be inserted into the card connector 1 from insertion slot 18 via insertion slot 95*a* even when the insertions slots 18, 95*a* are misaligned.

More specifically, as shown in FIG. 7, because the first elastic member 171 is interposed between the peripheral wall surface of the operating portion 166 of the second resin portion 165, which is the portion inserted into the insertion slot 95*a*, and the inner peripheral surface of the insertion slot 95*a*, any deviation in the positional relationship between the insertion slot 95*a* and the operating portion 166 from the regular positional relationship can be absorbed by the deformation of the first elastic member 171. Similarly, because the second elastic member 172 is interposed between the first resin portion 161, which is the portion inserted into insertion slot 18, and the second resin portion 165, which is the portion inserted into insertion slot 95*a*, any deviation in the positional relationship between the first resin portion 161 and the second resin portion 165 due to misalignment of insertion slot 18 and insertion slot 95*a* can be absorbed by the deformation of the second elastic member 172.

In other words, positional deviations between components due to misalignment of insertion slot 18 and insertion slot 95*a* can be absorbed in different spots by the elastic members, that is, the first elastic member 171 and the second elastic member 172. Because the amount of deformation in one elastic member is mostly offset by deformation of the other elastic member, the amount of displacement is slight and the deformation limit is not exceeded. Therefore, the card tray 160 can be easily and reliably inserted from insertion slot 18 into the card connector 1 via insertion slot 95*a* because any deviation in the positioning of components due to misalignment of the insertion slots 18, 95*a* can be absorbed by slight deformation of the elastic members.

Because the amount of deformation in the first elastic member 171 is mostly offset by deformation of the second elastic member 172 even when there is misalignment of the insertion slots 18, 95*a*, the space between the inner peripheral surface of the insertion slot 95*a* and the outer wall portion of the operating portion 166 can be reliably sealed by the first elastic member 171. As a result, foreign matter from outside such as water and grime is kept out of the interior of the case.

The following is an explanation of the operations performed to eject the card tray 160 from the card connector 1.

In the present embodiment, the user operates an auxiliary member (not shown) to apply pressure to the head portion 181*b* of the ejection operation member 181. The auxiliary member can be a slender rod-shaped member such as a pin or rod. In the following explanation, it is a linear rod-shaped member made of metal.

First, the user manually operates the auxiliary member, and the auxiliary member is passed from the rear of the card tray 160 into a through-hole 168 formed in the rear panel portion 166*b* and brought into contact with the head portion 181*b* of the ejection operation member 181 housed in the through-hole 168.

Next, when the user pushes the ejection operation member 181 forward, the operating portion 22*a* of the push rod 22 is positioned on the center axis of the rod portion 181*a* of the ejection operation member 181. As a result, the leading end of the rod portion 181*a* comes into contact with the operating portion 22*a*.

When the user pushes in the ejection operation member 181 further, the push rod 22 reaches its maximum forward position, and the operating portion 22*a* of the ejection lever 21 is displaced to the position shown in FIGS. 8A and 8B. Because the head portion 181*b* comes into contact with the tiered portion 168*c* in the through-hole 168 at this time, the ejection operation member 181 reaches the maximum forward position.

In this way, the force output portion 21a of the ejection lever 21 is pressed against by the front end 161f, and the card tray 160 is displaced from the predetermined position rearward. At this time, the holding recessed portion 161a formed in the outer surface of the first longitudinal portion 162b in the first resin portion 161 of the card tray 160 is disengaged from the holding protruding portion 75a in the holding spring member 75. As a result, the ejection operation member 181 and the push rod 22 are subjected to resistance via the card tray 160 and the ejection lever 21 caused mainly by the elastically deformed holding spring member 75. However, the manual force applied by the user easily overcomes this resistance, and the operation moves forward against the resistance.

As a result, the rear panel portion 166b of the card tray 160 protrudes sufficiently from the outer wall 95, and the user can manually grasp the rear panel portion 166b and pull out the card tray 160 from the insertion slot 95a in the card connector 1.

In the embodiment explained above, the card tray 160 included a metal portion 151. However, the tray does not have to include a metal portion 151. The metal portion 151 can be omitted without compromising the strength of the card tray 160.

In the present invention, the card tray 160 can hold a card 101 with electrode pads and be inserted in the card connector 1. Here, the card tray 101 includes a card holding frame portion 162 facing the side surfaces of the card 101, a first resin portion 161 including a female connecting portion 163, an operating portion 166, a second resin portion 165 including a male connecting portion 167 connected to a female connecting portion 163, a first elastic member 171 mounted on the peripheral surface of the operating portion 166, and a second elastic member 172 mounted between the female connecting portion 163 and the male connecting portion 167.

Here, the card tray 160 can be easily and reliably inserted into the card connector 1 and ejected from the connector while also reliably preventing contamination of the interior of the device by foreign matter from the outside such as water and grime. As a result, the device is highly reliable.

Also, the card tray 160 can be inserted into the card connector 1 via an insertion slot 95a in the outer wall 95, and the section of the operating portion 166 including the mounted first elastic member 171 can be inserted into the insertion slot 95a. When this section is inserted into the insertion slot 95a, the first elastic member 171 is interposed between this section and the insertion slot 95a. As a result, the space between the insertion slot 95a and this section of the operating portion 166 is sealed by the first elastic member 171, and contamination by foreign matter from the outside such as water and grime can be prevented. Also, any discrepancy caused by the misalignment of the card connector 1 and the insertion slot 95a can be absorbed by deformation of the first elastic member 171 and the second elastic member 172. As a result, the card tray 160 can be easily and reliably inserted into the card connector 1 via the insertion slot 95a.

The female connecting portion 163 and the male connecting portion 167 do not have to connect linearly. They may connect via the second elastic member 172. In this way, any positional discrepancies between components caused by the misalignment of the card connector 1 and the insertion slot 95a can be absorbed in different locations by the elastic members, that is, the first elastic member 171 and the second elastic member 172. In other words, the amount of deformation by one elastic member can be offset by deformation of the other elastic member. As a result, the large permissible deformation limit is not exceeded. Therefore, even when the misalignment between the card connector 1 and the insertion slot 95a is significant, the card tray 160 can be inserted easily and reliably into the card connector 1 via the insertion slot 95a, and the amount of displacement in the first elastic member 171 is small enough to reliably prevent infiltration by foreign matter from the outside.

Also the ejection operation member 181 used to operate the ejection mechanism to eject the card tray 160 from the card connector 1 is slidably mounted on the operating portion 166 via a third elastic member 175. Here, the operating portion 166 includes a through-hole 168 for insertion of the ejection operation member 181, and the third elastic member 175 is interposed between the ejection operation member 181 and the through-hole 168. As a result, infiltration of foreign matter from the outside via the through-hole 168 can be reliably prevented.

Also, the card tray 160 includes a metal portion 151 integrally formed from a metal plate, and the first resin portion 161 and the second resin portion 165 are made of resin, and cover and are integrated with at least a portion of the metal portion 151. This increases the strength of the card tray 160.

The following is an explanation of a second embodiment of the present disclosure. Elements having the same structures as those in the first embodiment are denoted by the same reference numbers, and further explanation of these elements has been omitted. Further explanation of operations and effects identical to those in the first embodiment have also been omitted.

Figure 9A:
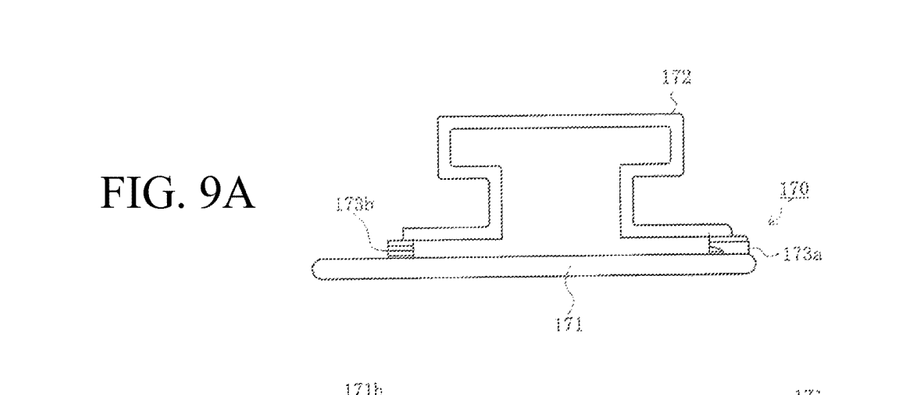
Figure 9B:
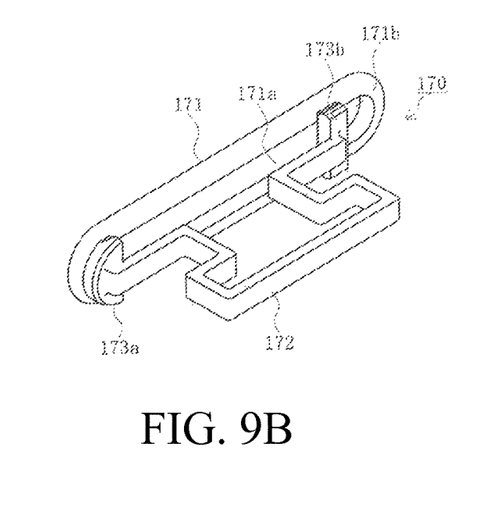
FIG. 9B is a first perspective view.
Figure 9C:
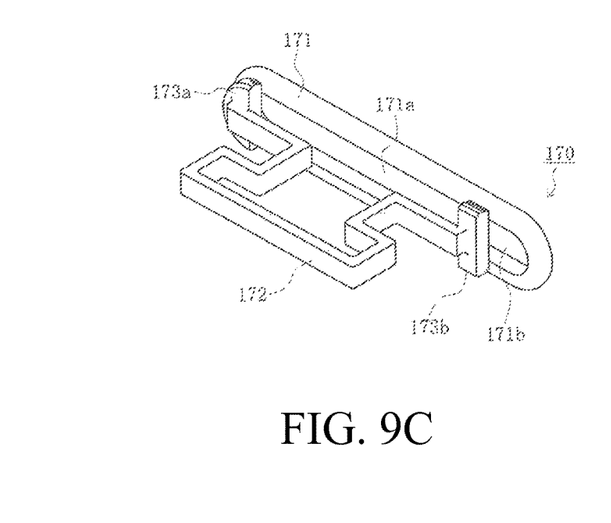
FIG. 9C is a second perspective view.

FIGS. 9A, 9B and 9C are a set of views showing the integrated elastic member in the card tray in a second embodiment of the present disclosure.

In the first embodiment, the first elastic member 171 and the second elastic member 172 are separate members. In the present embodiment, the first elastic member 171 and the second elastic member 172 are connected to each other to form an integrated elastic member 170. In all other respects, the present invention does not differ from the first embodiment.

More specifically, both ends of the second elastic member 172, which is an omega-shaped band or cord, are connected to the first elastic member 171, which is an oval-shaped or elliptical ring-shaped member, via a first connecting portion 173a and a second connecting portion 173b. The first connecting portion 173a is connected to the portion of the oval-shaped or elliptical first elastic member 171 at one end in the long-axis direction, and the second connecting portion 173b is connected to a portion closer to the center than to the other end in the long-axis direction. As a result, the oval-shaped or elliptical hole in the first elastic member 171 is divided into a long first portion 171a and a short second portion 171b. The guide portion 166c of the second resin portion 165 is inserted into the second portion 171b.

The first elastic member 171 and the second elastic member 172 in the present embodiment are identical to those in the first embodiment in every other respect, including the rest of the configuration, materials, operations, molding method, and mounting method in the card tray 160. Therefore, further explanation of these aspects of the elastic members has been omitted. Because the configuration and operation of the card 101, card tray 160, and card connector 1 in the present embodiment are identical to those in the first embodiment, further explanation of these aspects has also been omitted. Because the operations performed to insert the card tray 160 into the card connector 1 and eject the tray from the card connector 1 are the same as those in the first embodiment, further explanation of these operations has also been omitted. Because the effects are the same as those of the first embodiment, further explanation of the effects has also been omitted.

The present disclosure is not limited to the embodiments described above. Many variations are possible based on the spirit of the disclosure, and these do not depart from the scope of the present disclosure.

The present disclosure can be applied to a card holding member and a card connector set.

What is claimed is:

1. A card holding member which is configured to be inserted into a card connector, the card holding member comprising:
   a first portion having a card holding frame portion and a female connecting portion, the female connecting portion extending from the card holding frame portion in a first direction, the card holding frame portion being configured to hold a card;
   a second portion having an operating portion and a male connecting portion, the operating portion extending from the male connecting portion in the first direction and being configured to be manipulated when the card holding member is inserted into the card connector; and
   an elastic member mounted between the female connecting portion and the male connecting portion, whereby the first portion is connected to the second portion via the elastic member.

2. The card holding member as defined in claim 1, further comprising an ejection operation member, the ejection operation member configured to operate an ejection mechanism in order to eject the card holding member from the card connector, the ejection operation member being slidably mounted on the operating portion via a second elastic member.

3. The card holding member as defined in claim 1, wherein the first and second portions are formed of resin.

4. The card holding member as defined in claim 3, further comprising a metal portion which is integrally formed with the first portion.

5. The card holding member as defined in claim 1, wherein the elastic member is a first elastic member, and further comprising a second elastic member mounted on an outer periphery of the operating portion.

6. The card holding member as defined in claim 1, wherein the female connecting portion and the male connecting portion are co-planar.

7. The card holding member as defined in claim 6, wherein the elastic member is co-planar with each of the female and male connecting portions.

8. A card holding member which is configured to be inserted into a card connector, the card holding member comprising:
   a first portion having a card holding frame portion and a female connecting portion, the female connecting portion extending from the card holding frame portion in a first direction, the card holding frame portion being configured to hold a card;
   a second portion having an operating portion and a male connecting portion, the operating portion extending from the male connecting portion in the first direction and being configured to be manipulated when the card holding member is inserted into the card connector; and
   an elastic member mounted between the female connecting portion and the male connecting portion, whereby the first portion is connected to the second portion via the elastic member,
   wherein the female connecting portion defines a substantially T-shaped opening, wherein the male connecting portion is a substantially T-shaped plate, the male connecting portion being positioned within the substantially T-shaped opening of the female connecting portion, the male connecting portion being sized to be smaller than the substantially T-shaped opening of the female connecting portion to define a gap therebetween, the elastic member being positioned to fill the gap between the male connecting portion and the substantially T-shaped opening of the female connecting portion.

9. The card holding member as defined in claim 8, wherein the female connecting portion and the male connecting portion are co-planar.

10. The card holding member as defined in claim 9, wherein the elastic member is co-planar with each of the female and male connecting portions.

11. A card holding member which is configured to be inserted into a card connector, the card holding member comprising:
   a first portion having a card holding frame portion and a female connecting portion, the female connecting portion extending from the card holding frame portion in a first direction, the card holding frame portion being configured to hold a card;
   a second portion having an operating portion and a male connecting portion, the operating portion extending from the male connecting portion in the first direction and being configured to be manipulated when the card holding member is inserted into the card connector; and
   an elastic member mounted between the female connecting portion and the male connecting portion, whereby the first portion is connected to the second portion via the elastic member,
   wherein the elastic member has a first portion that is substantially T-shaped and which is positioned between the female and male connecting portions, and wherein the elastic member has a second portion defined by a pair of outwardly extending legs, the second portion of the elastic member being positioned between the female connecting portion and the operating portion.

12. The card holding member as defined in claim 11, wherein the female connecting portion and the male connecting portion are co-planar.

13. The card holding member as defined in claim 12, wherein the elastic member is co-planar with each of the female and male connecting portions.

14. A card holding member which is configured to be inserted into a card connector, the card holding member comprising:
   a first portion having a card holding frame portion and a female connecting portion, the female connecting portion extending from the card holding frame portion in a first direction, the card holding frame portion being configured to hold a card;
   a second portion having an operating portion and a male connecting portion, the operating portion extending from the male connecting portion in the first direction and being configured to be manipulated when the card holding member is inserted into the card connector;

an elastic member mounted between the female connecting portion and the male connecting portion, whereby the first portion is connected to the second portion via the elastic member; and an ejection operation member, the ejection operation member configured to operate an ejection mechanism in order to eject the card holding member from the card connector, the ejection operation member being slidably mounted on the operating portion via a second elastic member, wherein the operating portion defines a through-hole therethrough, the ejection operation member and the second elastic member extending through the through-hole, the second elastic member being interposed between the ejection operation member and the operating portion.

15. The card holding member as defined in claim 14, wherein the female connecting portion and the male connecting portion are co-planar.

16. The card holding member as defined in claim 15, wherein the elastic member is co-planar with each of the female and male connecting portions.

17. A card holding member which is configured to be inserted into a card connector, the card holding member comprising:

a first portion having a card holding frame portion and a female connecting portion, the female connecting portion extending from the card holding frame portion in a first direction, the card holding frame portion being configured to hold a card;

a second portion having an operating portion and a male connecting portion, the operating portion extending from the male connecting portion in the first direction and being configured to be manipulated when the card holding member is inserted into the card connector; and an elastic member mounted between the female connecting portion and the male connecting portion, whereby the first portion is connected to the second portion via the elastic member, wherein the elastic member is a first elastic member, and further comprising a second elastic member mounted on an outer periphery of the operating portion, and wherein the first and second elastic members are integrally formed as a single integrated elastic member.

18. The card holding member as defined in claim 17, wherein the female connecting portion and the male connecting portion are co-planar.

19. The card holding member as defined in claim 18, wherein the elastic member is co-planar with each of the female and male connecting portions.

* * * * *